(12) United States Patent
Borgström et al.

(10) Patent No.: US 11,407,542 B2
(45) Date of Patent: Aug. 9, 2022

(54) METHOD FOR GAS FILLING OF A COMPARTMENT OF A FLEXIBLE CONTAINER

(71) Applicant: ECOLEAN AB, Helsingborg (SE)

(72) Inventors: Magnus Borgström, Helsingborg (SE); Sebastian Ekelund, Klippan (SE); Ulf Nordlöf, Kivik (SE)

(73) Assignee: ECOLEAN AB, Helsingborg (SE)

( * ) Notice: Subject to any disclaimer, the term of this patent is extended or adjusted under 35 U.S.C. 154(b) by 23 days.

(21) Appl. No.: 15/568,095

(22) PCT Filed: Apr. 23, 2015

(86) PCT No.: PCT/EP2015/058744
§ 371 (c)(1),
(2) Date: Oct. 20, 2017

(87) PCT Pub. No.: WO2016/169596
PCT Pub. Date: Oct. 27, 2016

(65) Prior Publication Data
US 2018/0079539 A1     Mar. 22, 2018

(51) Int. Cl.
*B65B 31/04*     (2006.01)
*B65B 43/46*     (2006.01)
(Continued)

(52) U.S. Cl.
CPC ............... *B65B 31/04* (2013.01); *B65B 3/04* (2013.01); *B65B 43/465* (2013.01); *B65B 51/14* (2013.01);
(Continued)

(58) Field of Classification Search
CPC ......... B65B 31/04; B65B 3/04; B65B 43/465; B65B 51/14; B65B 51/146; B65B 51/32;
(Continued)

(56) References Cited

U.S. PATENT DOCUMENTS

| | | | | |
|---|---|---|---|---|
| 4,049,854 A | * | 9/1977 | Casey | ..................... B29C 65/18 |
| | | | | 428/72 |
| 7,444,795 B2 | * | 11/2008 | Yasuhira | ............... B65B 43/465 |
| | | | | 53/133.2 |

(Continued)

FOREIGN PATENT DOCUMENTS

| | | |
|---|---|---|
| EA | 201070408 A1 | 8/2010 |
| EP | 2781459 A1 | 9/2014 |

OTHER PUBLICATIONS

Russian Office Action Application No. 2017136099/10 (062958) dated Dec. 14, 2018, 4 pages.

(Continued)

*Primary Examiner* — Chelsea E Stinson
*Assistant Examiner* — Scott A Howell
(74) *Attorney, Agent, or Firm* — Brundidge & Stanger, P.C.

(57) ABSTRACT

A method for handling containers (I) of collapsible type in a filling machine (20) comprising consecutively arranged stations (S1, S2, S3, S4, S5, S6) comprising a filling station (S3) and a gas filling station (S5), the method comprising intermittently moving the containers (I) to the consecutively arranged stations (S1, S2, S3, S4, S5, S6), supplying, at the filling station (S3), liquid product into the product compartment (5) and supplying, at the gas filling station (S5), gas into the handle compartment (7). The filling station (S3) and the gas filling station (S5) are operated such that liquid product is supplied to the product compartment (5) of one of the containers (I) while gas is supplied to the handle compartment (7) of another of the containers (I). The step of supplying gas at the gas filling station (S5) comprises providing a first gas flow (Qi) at a first pressure (Pi) and delivering said first gas flow (Qi) from the nozzle (30) to the handle compartment (7) via said inlet (11), and subsequently providing a second gas flow ($Q_2$) at a second pressure ($P_2$), (Continued)

lower than said first pressure ($P_1$), and delivering said second gas flow ($Q_2$) from the nozzle (30) to the handle compartment (7) via said inlet (11) for establishing a target pressure ($P_T$) inside said handle compartment (7) corresponding to said second pressure ($P_2$).

7 Claims, 11 Drawing Sheets

(51) Int. Cl.
  B65B 51/32      (2006.01)
  B65B 61/14      (2006.01)
  B65D 75/00      (2006.01)
  B65B 51/14      (2006.01)
  B65D 75/56      (2006.01)
  B65B 3/04       (2006.01)
  B29C 65/00      (2006.01)
  B29C 65/78      (2006.01)
  B65B 51/10      (2006.01)
  B29C 65/02      (2006.01)
  B29C 65/18      (2006.01)
  B29L 23/20      (2006.01)

(52) U.S. Cl.
  CPC ............ *B65B 51/146* (2013.01); *B65B 51/32* (2013.01); *B65B 61/14* (2013.01); *B65D 75/008* (2013.01); *B65D 75/563* (2013.01); *B29C 65/02* (2013.01); *B29C 65/18* (2013.01); *B29C 65/7841* (2013.01); *B29C 66/3452* (2013.01); *B29C 66/43123* (2013.01); *B29C 66/71* (2013.01); *B29C 66/7234* (2013.01); *B29C 66/72341* (2013.01); *B29C 66/81417* (2013.01); *B29C 66/83221* (2013.01); *B29C 66/849* (2013.01); *B29L 2023/20* (2013.01); *B65B 2051/105* (2013.01)

(58) Field of Classification Search
  CPC .............. B65B 61/14; B65B 2015/105; B65B 2023/20; B65B 2051/105; B65D 75/563; B65D 75/008; B29C 65/02; B29C 65/18; B29C 65/7841; B29C 66/3452; B29C 66/43123; B29C 66/71; B29C 66/7234; B29C 66/72341; B29C 66/83221; B29C 66/849; B29C 66/81417; B29L 2023/20
  USPC ........................................................... 53/403
  See application file for complete search history.

(56) References Cited

U.S. PATENT DOCUMENTS

| | | | | |
|---|---|---|---|---|
| 7,654,063 | B2* | 2/2010 | Forss | B65D 75/563 53/434 |
| 8,051,628 | B2* | 11/2011 | Gustafsson | B65B 61/14 53/403 |
| 8,181,428 | B2* | 5/2012 | Gustafsson | B65B 61/14 53/413 |
| 9,499,322 | B2* | 11/2016 | Araki | B65D 75/5883 |
| 9,919,822 | B2* | 3/2018 | Yoshikane | B65B 31/048 |
| 2007/0068118 | A1* | 3/2007 | Forss | B65D 75/563 53/403 |
| 2007/0089377 | A1 | 4/2007 | Yasuhira | |
| 2008/0209854 | A1* | 9/2008 | Gustafsson | B65B 61/14 53/79 |
| 2014/0250834 | A1* | 9/2014 | Yoshikane | B65B 31/048 53/403 |
| 2014/0283483 | A1* | 9/2014 | Yoshikane | B65B 31/04 53/403 |
| 2018/0079539 | A1* | 3/2018 | Borgstrom | B65B 31/04 |

OTHER PUBLICATIONS

Office Action for European App. No. 15718214.8 dated Jan. 21, 2019, 10 pages.
International Search Report from International Application No. PCT/EP2015/058744 dated Jan. 22, 2016.
Notice of Acceptance for Australian Patent Application No. 2015392208, dated Apr. 17, 2020, 3 pages.

* cited by examiner

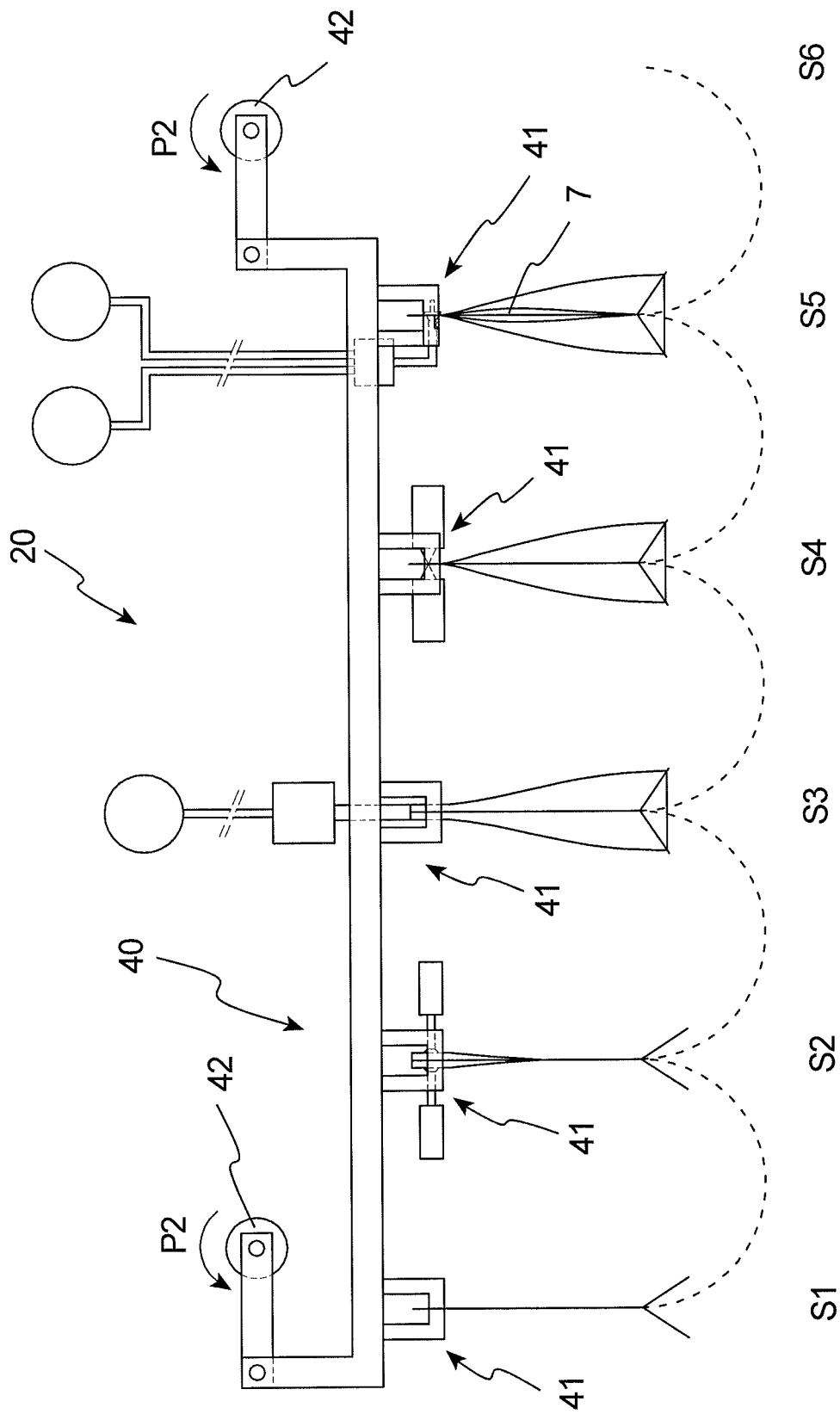

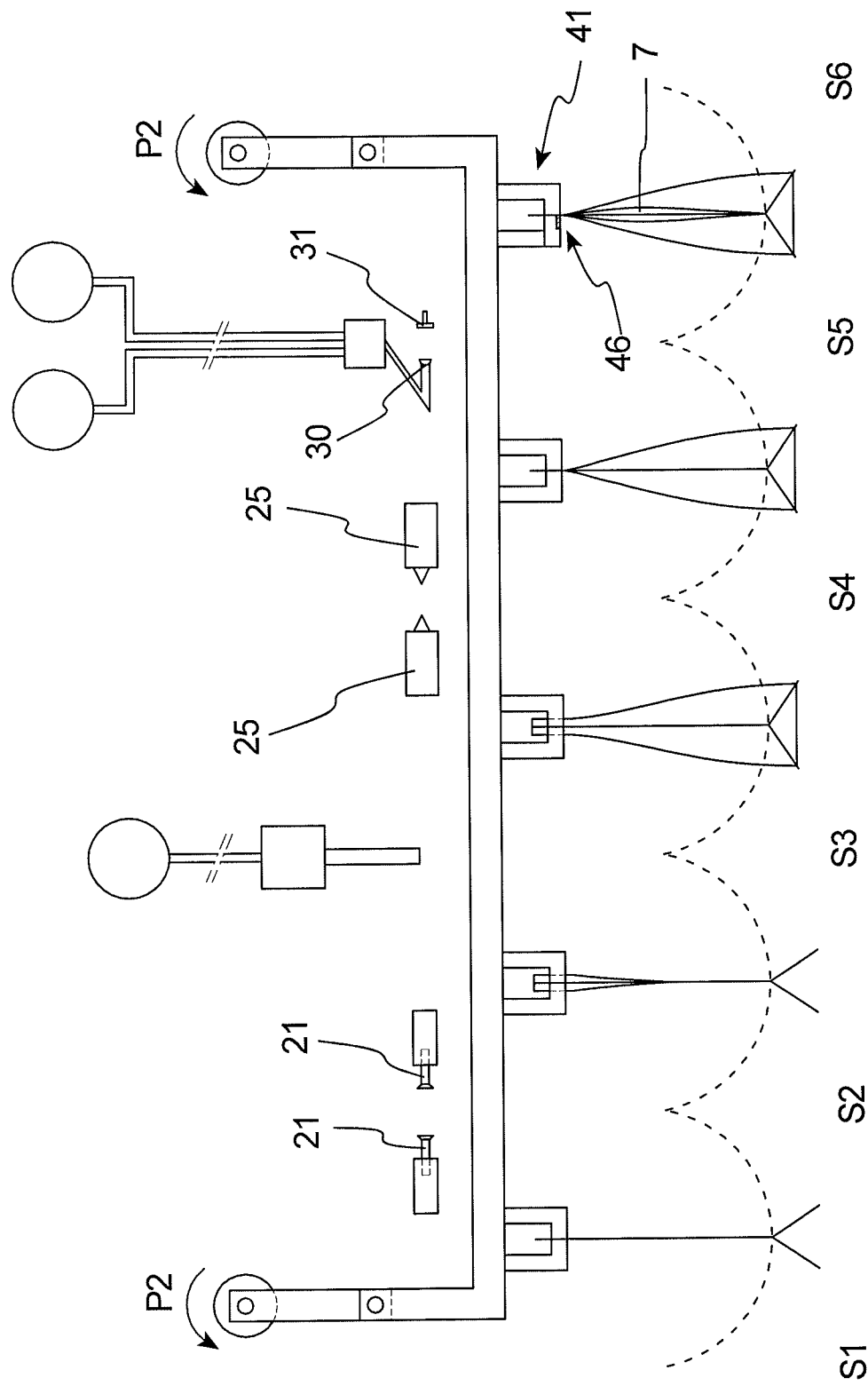

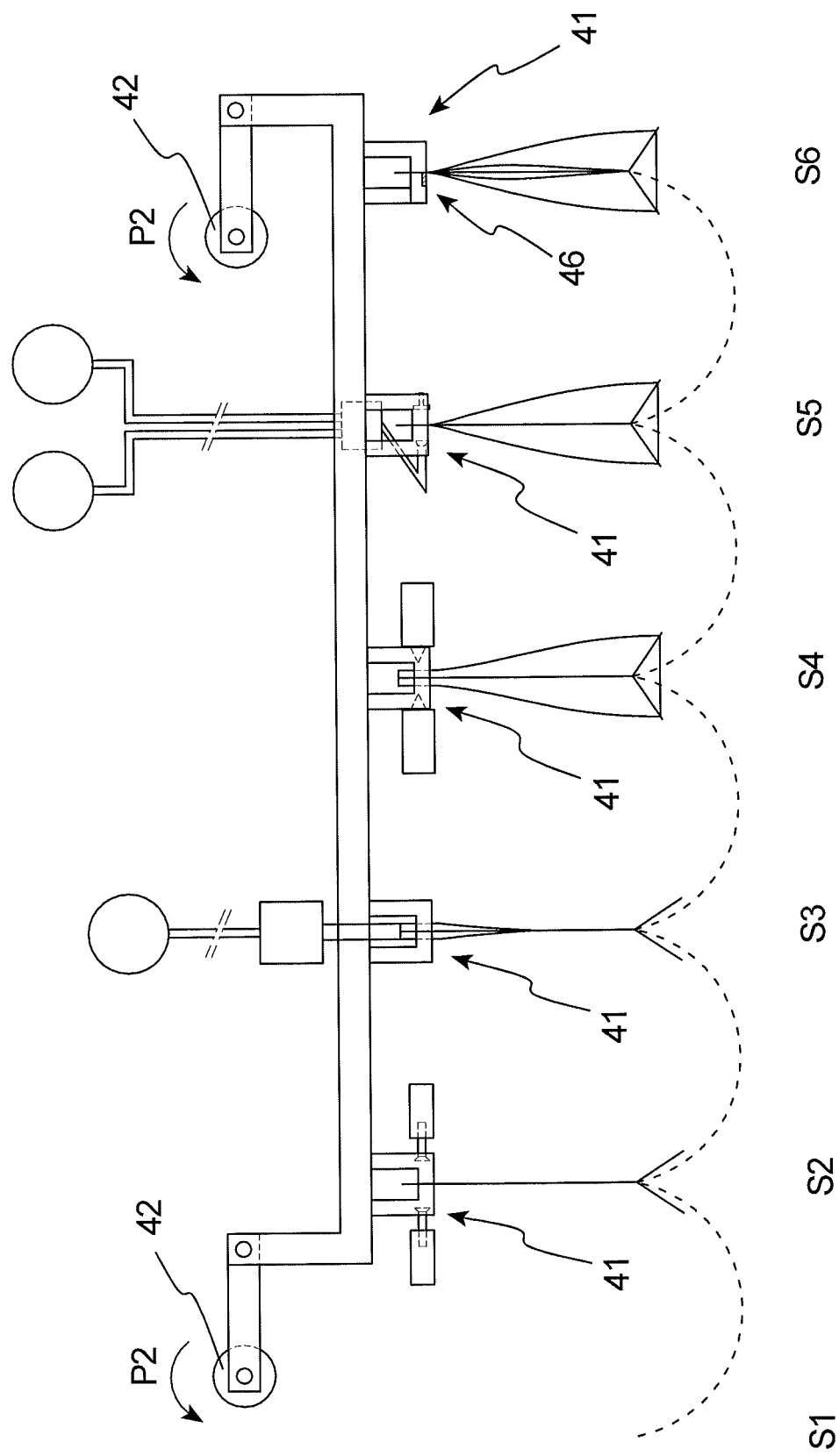

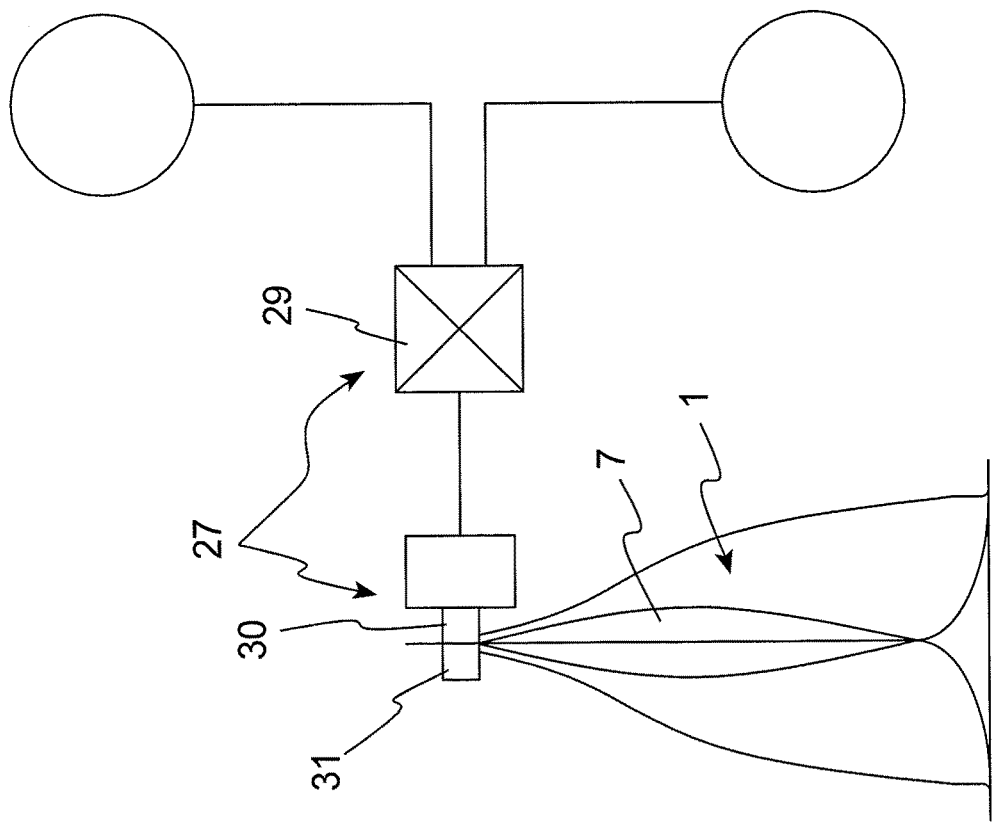
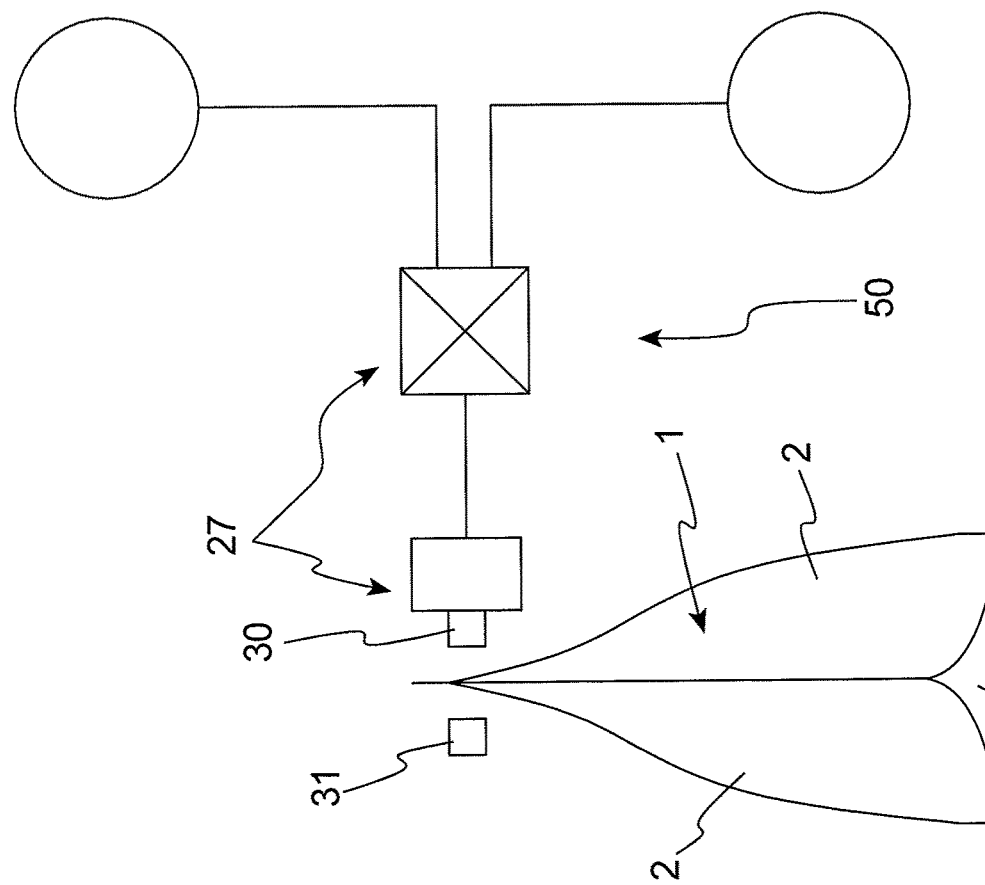

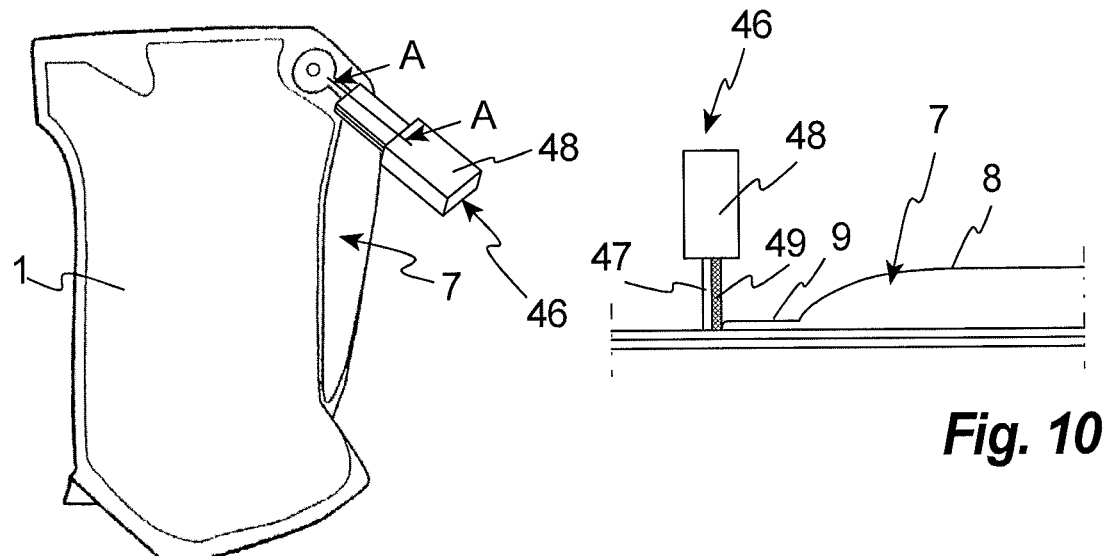
*Fig. 10*
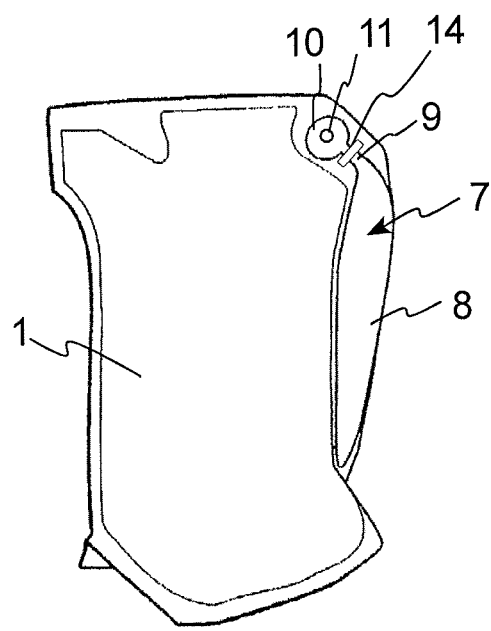
*Fig. 9*
*Fig. 11*

METHOD FOR GAS FILLING OF A COMPARTMENT OF A FLEXIBLE CONTAINER

FIELD OF THE INVENTION

The present invention relates to a method for handling containers of collapsible type and more specifically to such a method for handling the containers in a filling machine comprising consecutively arranged stations comprising a filling station and a gas filling station.

BACKGROUND ART

It has been known for a long time to use containers of a collapsible type, for example, for foodstuffs or expendable material such as sanitary articles and detergents. The contents can be both in liquid and in powder form.

By a container of a collapsible type is meant the type of container that consists of thin flexible walls which are joined in connecting portions to define a product compartment. The volume of the product compartment depends on the relative distance between the walls, which means that the volume depends on the filling ratio of the container.

This type of containers may have a number of different handle shapes, for instance as shown in WO 2005/030599 or WO2006/121388.

The container may comprise at the rear end thereof a handle-forming handle compartment intended to be filled with gas in order to form a handle which may be griped by a user in order to handle the container like a jug. The handle compartment may comprise three segments, a first of which is intended to form the actual handle; a second which is being provided with an inlet through which the handle compartment communicates with the surroundings; and a third which is connecting the first segment with the second segment.

In order to fill the handle compartment with gas, a nozzle of a gas filling device is applied over the inlet, and gas is supplied to the handle compartment trough said inlet. As a response to the supplied gas, side wall portions defining the second segment of the handle compartment bulge, allowing the gas to proceed to the third and first segments of the handle compartment.

Such a gas filling device may be arranged at a gas filling station of a filling machine comprising consecutively arranged stations including said gas filling station and a filling station for supplying a liquid product to the product compartment of the containers.

Such a filling machine is described for instance in WO2009/041909. The containers are intermittently moved to the consecutively arranged stations which are operated in parallel. The containers are thus moved step-by-step from one station to the next, and one of the containers is handled at one of the stations while other containers are being handled at the other stations.

It is for obvious reason desired for the filling machine to have a high production capacity. Since the stations of the filling machine are operated in parallel, it will be the station requiring the longest operating time that will determine the production capacity of the filling machine.

Thus, in order to ensure that the gas filling station does not hamper the production capacity of the filling machine, the gas filling operation must be performed at a high speed and should not require more time than the filling operation at the filling station. However, the procedure of filling a handle compartment with gas by supplying the gas via an inlet provided in a side wall of the container is a somewhat stochastic process, especially at high speed production, and it has in some cases proved difficult to achieve a high reliability at high speed production in the gas filling process resulting in an unacceptable high fault rate with some handle compartment being overfilled to such an extent that they burst.

Consequently, there is a need for an improved method for handling containers of collapsible type in a filling machine comprising a filling station and a gas filling station.

SUMMARY OF THE INVENTION

With the above in mind, it is an object of the present invention to provide an improved method for handling containers of collapsible type in a filling machine having consecutively arranged stations comprising a filling station and a gas filling station.

A further object is to provide such a method enabling gas filling at high speed with a comparable low fault rate.

Another object is to provide such a method enabling high-speed production and eliminating or at least substantially reducing the risk of overfilling of the handle compartment.

These objects, and also other objects which will be evident from the following description of the invention, are achieved, in full or at least in part, by a method for handling containers of collapsible type in a filling machine having the features defined in claim 1. Embodiments emerge from the sub-claims dependent on the main claim.

More specifically, a method is provided for handling containers of collapsible type in a filling machine comprising consecutively arranged stations comprising a filling station and a gas filling station. Each container comprises two flexible opposing side walls defining a product compartment communicating with the environment via a filling duct and a separate handle compartment communicating with the environment via a gas inlet arranged in one of the two side walls. The method comprises intermittently moving the containers to the consecutively arranged stations, supplying, at the filling station, liquid product into the product compartment by means of a filling tube inserted in the filling duct of the container and supplying, at the gas filling station, gas into the handle compartment by means of a nozzle applied over the gas inlet. The filling station and the gas filling station are operated such that liquid product is supplied to the product compartment of one of the containers situated at the filling station while gas is supplied to the handle compartment of another of the containers situated at the gas filling station. The step of supplying gas at the gas filling station comprises providing a first gas flow at a first pressure and delivering said first gas flow from the nozzle to the handle compartment via said inlet, and subsequently providing a second gas flow at a second pressure, lower than said first pressure, and delivering said second gas flow from the nozzle to the handle compartment via said inlet for establishing a target pressure inside said handle compartment corresponding to said second pressure.

Hereby, an improved method handling containers of collapsible type in a filling machine comprising consecutively arranged stations is achieved. By moving the containers intermittently to the consecutively arranged stations being operated in parallel, a high production capacity is obtainable. Further, it is ensured that the step of supplying gas at the gas filling station may be carried out with high reliability and at high speed not hampering the production capacity of filling machine. By delivering a first gas flow at a first pressure, it is possible to provide the first gas flow at a pressure sufficiently high in order to quickly introduce air into the handle compartment. Further, by providing the subsequent, second gas flow at a pressure corresponding to the target pressure, it is possible to ensure that the handle compartment is filled with gas in a sufficient amount without running the risk of overfilling the handle compartment which would cause risk for rupture or bursting of the duct. Thus, the first gas flow may be used like a pressure surge inflating the handle compartment, while the second gas flow completes the gas filling. As a result, a method for handling containers is provided which may be operated at high speed and a very low fault rate.

According to an embodiment of the inventive method, an amount of gas may be delivered to the handle compartment, during the step of providing the first gas flow, sufficient for inflation thereof but insufficient to reach said target pressure. Hereby the risk of overfilling the handle compartment is eliminated. The amount of gas delivered to the handle compartment during the step of providing the first gas flow may correspond to 5-75 weight % of the total amount of gas delivered to the handle compartment during the step of providing the first gas flow and the step of providing the second gas flow.

The first gas flow may be supplied with the first pressure in the range of 1-7 bar and more preferably in the range of 1.8-3.5 bar above atmospheric pressure. The second gas flow may be supplied with the second pressure in the range of 0.3-2 bar and more preferably 0.5-1.0 bar above atmospheric pressure.

According to another embodiment of the inventive method, it may further comprise sealing the handle compartment once the target pressure has been reached. The sealing may be achieved by means of a sealing jaw having a heatable sealing member and a non-heatable section with low thermal conductivity, wherein the sealing jaw is engaged with the handle compartment in order to provide a seal trapping the gas filling the handle compartment and wherein the non-heatable section of the sealing jaw is arranged to face the pressurized side of the handle compartment. Hereby exposure of the pressurized handle compartment to the heatable sealing member during the forming of the seal is avoided, whereby a more reliable sealing of the gas filled handle compartment is provided.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 6*a*-6*d* are schematic views illustrating an embodiment of the inventive method for handling containers of collapsible type in a filling machine comprising consecutively arranged stations.

FIGS. 7*a*-7*b* are schematic views illustrating the gas filling operation according to an embodiment of the inventive method.

FIG. 9 is a schematic perspective view illustrating a step according to an embodiment of the inventive method of sealing a gas filled handle compartment of a container.

FIG. 10 is a cross-sectional view taken along line A-A in FIG. 7.

FIG. 11 is a perspective view of a container of collapsible type provided with a seal trapping gas supplied to its handle compartment.

DESCRIPTION OF EMBODIMENTS

Figure 1:
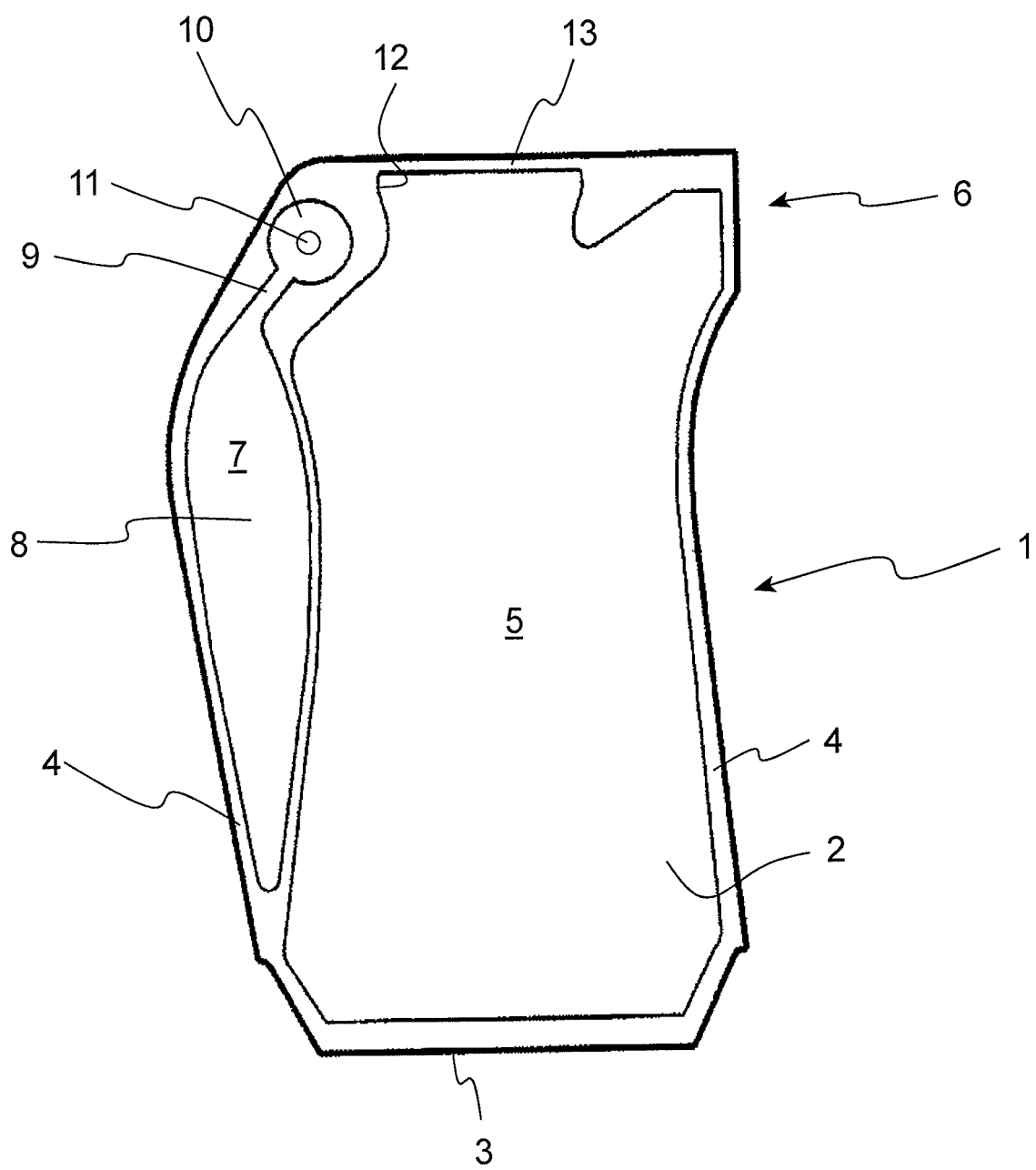
FIG. 1 is a side view of a container of a collapsible type suitable for usage together with method according to the present invention.

With reference to FIG. 1, an example of a collapsible container 1 is shown to which the device and method in accordance with the present invention may be applied. The container may be used as a pre-made container adapted to be filled and sealed in a filling machine. Alternatively, the container may be produced fully or in part in the filling machine.

The container is especially intended for products in the form of liquid foodstuffs such as milk, water, fruit drinks, juice or wine, but it may, of course, also be intended for products in some other form or for other purposes.

The container comprises three flexible walls, two of which constitute side walls 2 and the third constitutes a bottom wall 3. The walls are joined along connecting portions 4 to define a product compartment 5. The walls 2, 3 are made of a bendable and flexible material, which means that the volume of the product compartment 5 depends on the relative distance between the walls 2, 3. The volume of the product compartment 5 is thus directly dependent on the filling ratio of the container 1. In other words, the container is of a collapsible type, also referred to as pouch type package.

The walls 2, 3 of the container 1 are preferably joined in the connecting portions 4 by welding. Also other methods of joining, such as gluing, are conceivable.

The shown container 1 has at its upper front end an opening portion 6 which is formed as a spout. To open the container 1, an outer end of the opening portion 6 is separated, thereby making the product compartment 5 communicate with the environment. The outer end can be separated, for example, by cutting or tearing off. The container 1 may thus in its filled state be emptied in a pouring motion like when handling a jug.

Generally it is desirable for the selected container material to consist of a multilayered film comprising a core layer of mineral-based filler and a binder of polyolefin. It will be appreciated that also other materials and layers are possible, such a gas barrier layer or a light barrier layer.

At the rear end of container 1, a handle compartment 7 intended to be filled with gas in order to form a handle is shown. The handle compartment 7 is defined by the two side walls 2 and a peripheral connecting portion 4.

In the shown embodiment, the handle compartment 7 has as a single compartment design with three segments which all communicate with each other. The first segment 8 comprises the part that is intended to form the actual handle. The first segment 8 thus is the segment which in the completed container gives the desired function, whether, like in the shown and described example, it consists of a handle or it provides some other function, such as a stiffening effect. A third segment 9 is directly connected to the first segment 8 and constitutes a narrow duct that will be described below. A second segment 10 is directly connected to the third segment 10. The second segment 10 consists in its simplest form of an area defined by a portion of the two opposed side walls 2 with an inlet 11 in the form of a hole in one side wall 2. The inlet 11 thus constitutes an entry to the handle compartment 7, through which inlet 11 the handle compartment 7 communicates with the environment before being filled with gas and sealed.

As mentioned above, the third segment 9 constitutes a narrow duct. Its main function is to form a surface over which a means for sealing of the duct after completion of the gas filling can be arranged.

The third segment 9 may also be used for gripping the container 1 with the purpose of transferring it from a gas filling station at which the handle compartment 7 has been filled with gas. The handle compartment may be sealed during this transfer or may be transferred to a station at which the handle compartment 7 is sealed in order to trap the supplied gas. The cross-sectional area of the third segment 9 is significantly smaller than the cross-sectional area of the first segment 8. By cross-sectional area is in this case meant the area that can be made up by the side walls between them transversely to the longitudinal direction of the handle compartment.

The third 9 and the second segment 10 of the handle compartment 7 may on their insides be provided with an embossed surface (not shown). The embossed surface may facilitate separation of the associated side wall portions in connection with gas filling.

The handle compartment 7 with the three segments 8, 9, 10 is in the shown embodiment oriented in such a manner that the second segment 10 is arranged adjacent to the upper part of the container 1, i.e. the portion through which the product compartment 5 of the container 1 is intended to be filled with its contents. However, it will be appreciated that the handle compartment 7 can be oriented fully as desired.

As mentioned above, the handle compartment 7 is intended to be filled with gas in order to form a handle of the container. By gas is preferably meant air, but of course also other gases may be used. The handle compartment 7 has such a geometry and filling ratio as to form an easy-to-grip handle in inflated state. Such a handle may also promote by its geometry and gas filling a considerable rigidity of the container 1.

The container 1 has centrally in its upper part a filling duct 12 through which the compartment 5 of the container 1 may be filled with a liquid product. When the container 1 is pre-made and intended to be provided as a blank to a filling machine, as in the shown embodiment, the filling duct 12 may be closed by an end closure 13 which has to be removed prior to filling. After completion of the filling, the filling duct 12 is once more sealed.

Figure 2:
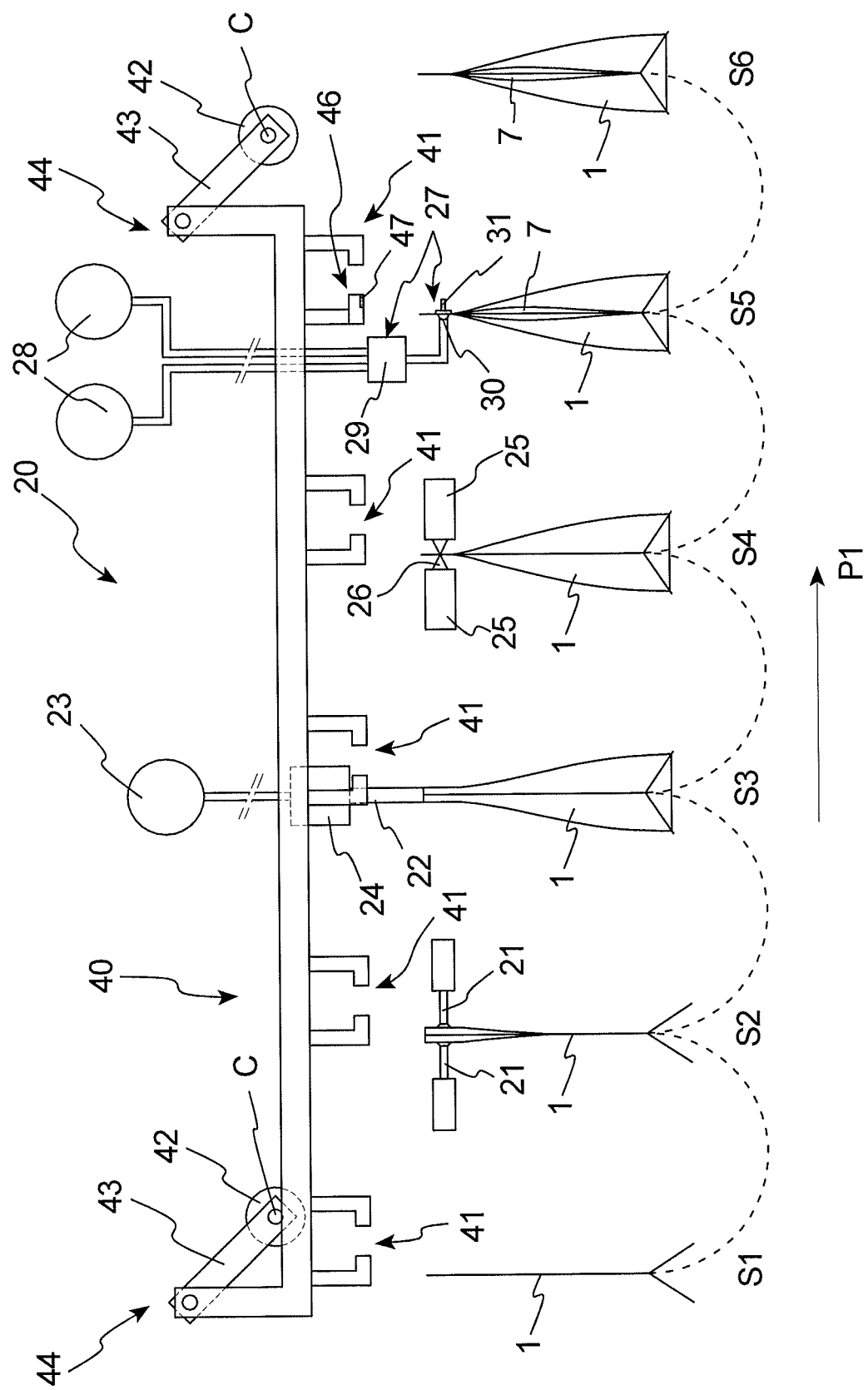
FIG. 2 is a schematic view of a filling machine comprising consecutively arranges stations.

In FIG. 2, to which reference now is made, a filling machine 20 handling containers 1 of the type described above, i.e. containers of collapsible type, is schematically shown. The illustrated section of the filling machine 20 is intended for handling of containers by intermittently feeding them in a broad wise direction.

The filling machine 20 comprises consecutively arranged stations including a filling station S3 and a gas filling station S5. Each station may comprise not shown grippers for holding the container 1 at the associated station. It should be realized that the stations may be integrated in the grippers.

In the shown embodiment, the consecutively arranged stations comprise: an input station S1 for receiving containers, for instance from a section of the filling machine in which section the containers have been fed in an edge wise direction; an opening station S2 for opening-up of the filling duct of the containers; a filling station S3 for filling of the product compartment of the containers; a sealing station S4 for sealing the filled product compartment of the containers; a gas filling station S5 for inflating the handle compartment of the containers; and an output station S6 form which the containers is transferred for subsequent handling. A container 1 of the type described above with reference to FIG. 1 is shown at each station.

The opening station S2 may comprise a pair of suction cups 21 arranged to engage the opposing side wall portions defining the filling duct and to separate the opposing side wall portions by separation of the suction cups 21.

The filling station S3 may comprise a filling tube 22 which is connected to a liquid product source 23 via a product valve 24. The filling tube 22 is insertable into the filling duct of the container 1 once the filling duct has been opened-up in the preceding opening station S3.

The sealing station S4 may comprise a pair of sealing jaws 25, of which at least one comprises a first sealing member 26, which may be permanently heated. The sealing jaws 25 may be arranged to engage a container 1 situated at the sealing station S3 such that the first sealing member 26 provides the container with a seal closing the filling duct once the product compartment has been filled in the preceding filling station S3 and thereby to seal the product compartment. The sealing jaws 25 may be integrated in, or form, the gripper holding the container 1 at the sealing station S4.

The gas filling station S5 comprises in the shown embodiment a nozzle unit 27 connected to two sources 28 of pressurized gas. The nozzle unit 27 comprises a control unit 29, a nozzle 30 and an abutment 31 against which the nozzle 30 is movably arranged in order to clamp a container 1 and to apply the nozzle 30 over the inlet of the handle compartment. The nozzle 30 and the abutment 31 may be integrated in the gripper holding the containers at the gas filling station S5. The gas filling station S5 will be described more in detail below.

The filling machine 20 further comprises a transfer unit 40. The shown embodiment of the transfer unit 40 is arranged to transfer the containers 1 intermittently in a broad wise direction in the direction indicated by arrow P1 and are arranged for gripping the containers 1 in an upper part thereof such that the containers are suspended in the transfer unit 40. The containers are intermittently moved to the consecutively arranged stations, and the containers are thus moved step-by-step from one station to the next The transfer unit comprises gripping members 41 for retrieving a container 1 from an up-stream situated station and for transferring it to a neighboring down-stream situated station.

The transport unit 40 is carried by rotatable mounts 42. Each mount 42 comprises an arm 43, which at its end 44 facing away from the centre of rotation C of the mount 42 is pivotally carried in bearings in the transport unit 40. This allows a circular motion to be imparted to the transport unit 40 and, more specifically, each of the gripping members 41 to be cyclically moved along a circular, endless path between a pick-up position and delivery position.

Each of the gripping members 41 may comprise a pair of jaws which jaws are movable against each other in order to pinch the upper portion of the container.

The transfer unit 40 may for instance comprise pneumatic, hydraulic and/or mechanic means (not shown) for operation of the pairs of jaws.

In the figure, the gripping members 41 are shown in an open position.

The gripping member 41 arranged for retrieving a container from the gas filling station S5 and transferring it to the output station S6 may as in the shown embodiment further comprise a gas sealing unit 46 integrated therein. The gas sealing unit 46 comprises a sealing member 47 arranged to provide the container 1 with a seal entrapping gas introduced into the handle compartment 7. Alternatively, the gas sealing station may be integrated in the gas filling station or an additional station for providing the seal may be arranged as a neighboring down-stream situated station relative the gas filling station S5.

Figure 3:
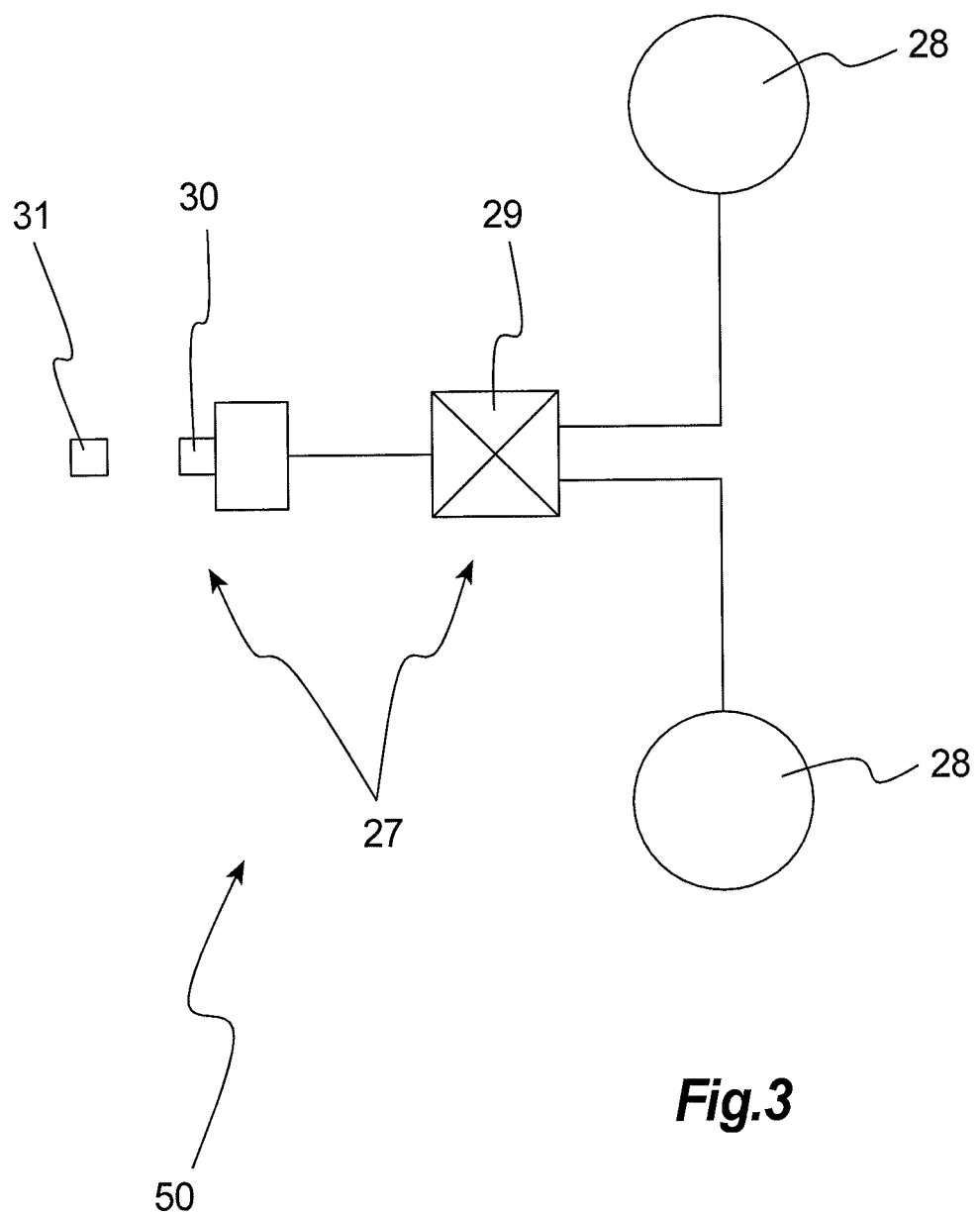
FIG. 3 is a schematic view of a gas filling station of a filling machine.

The gas filling station S5 will now be described more in detail with reference to FIG. 3 schematically illustrating a device 50 arranged at the gas filling station S5 for gas filling of a handle compartment of a container of the type disclosed above.

The shown embodiment of the device 50 comprises nozzle unit 27 connected to two sources 28 of pressurized gas. The nozzle unit 27 comprises an abutment 31, a nozzle 30 and a control unit 29.

The nozzle 30 is connected to the control unit 29 which in turn is connected to the two sources 28 of pressurized gas.

The nozzle 30 and the abutment 31 are movable towards each other such that said second segment of the handle compartment of the container may be clamped between them with the inlet of said second segment facing the nozzle 30. It is understood that one of the nozzle 30 and the abutment 31 may be stationary arranged.

Figure 4:
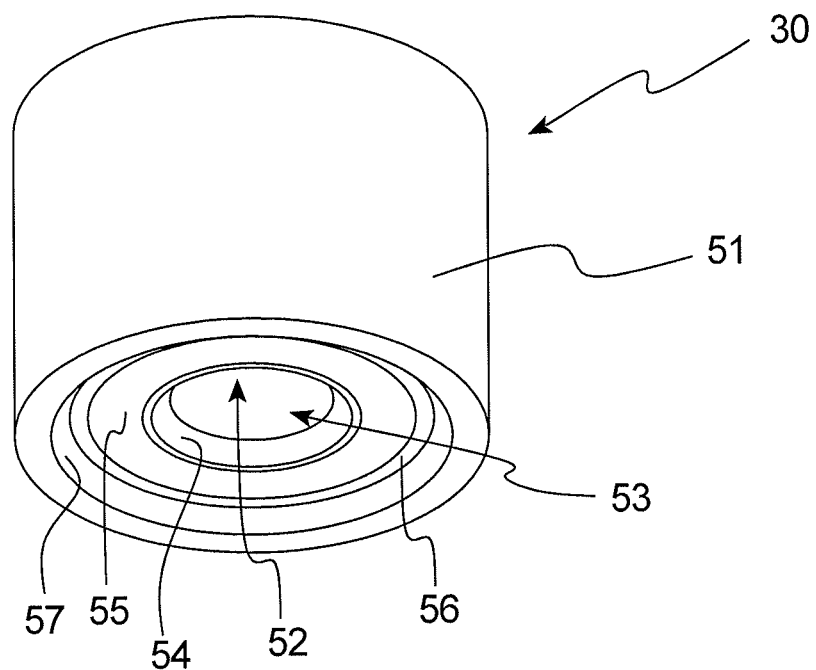
FIG. 4 is perspective view of an embodiment of a nozzle of a nozzle unit included in the gas filling station.
Figure 5:
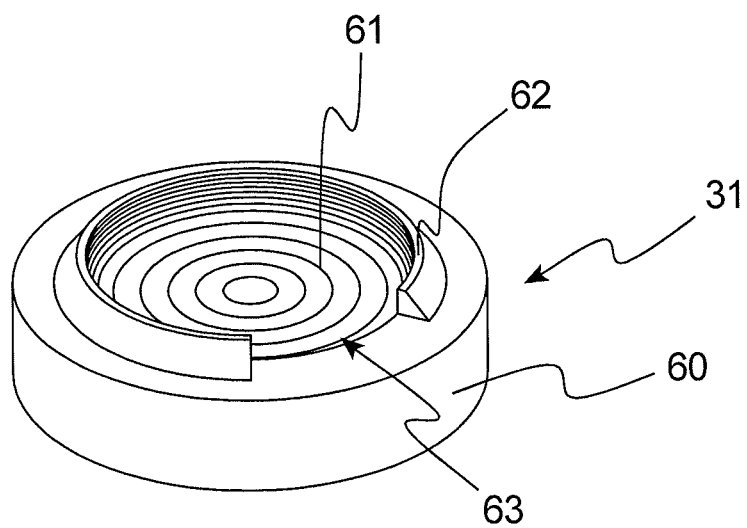
FIG. 5 is a perspective view of an embodiment of an abutment of a nozzle unit included in the gas filling station.

An embodiment of the nozzle 30 and the abutment 31 is shown in FIGS. 4 and 5 to which reference now also is made.

The nozzle 30 disclosed in FIG. 4 comprises a cylindrical body 51 with a central conduit 52 terminating in an outlet 53 with a chamfered periphery 54 for delivery of the gas to the handle compartment of the container. The outlet 53 is enclosed by an annular groove 55 and an engagement surface 56 is provided radially outside said annular groove 55. A peripheral collar 57 encloses the engagement surface 56.

The abutment 31 shown in FIG. 5 comprises a body 60 with a recess 61 provided in its top surface. The recess 61 is partially enclosed by an elevated, C-shaped abutment surface 62 defining a side opening 63 to said recess 61.

The device 50 further comprises a not shown movement means for relative motion of the nozzle 30 and the abutment 31 towards each other such that engagement surface 56 of the nozzle 30 abuts the abutment surface 62 of the abutment 31 for clamping of the container. This movement means may comprise pneumatic, hydraulic, electrical or mechanical means or the like.

The device 50 is arranged for gas filling of said handle compartment of the containers by the nozzle unit 27 being arranged to deliver gas to the handle compartment via said inlet in order to establish a target pressure $P_T$ therein and thereby inflating said handle compartment. The container is made of a container material with a sufficient strength for the handle compartment to maintain its volume once the target pressure has been reached and not to expand any further.

More specifically, the nozzle unit 27 is arranged to inflate the handle compartment 7 of the container 1 described above with reference to FIG. 1 by supplying a first gas flow $Q_1$ at a first pressure $P_1$ and to subsequently supplying a second gas flow $Q_2$ at a second pressure $P_2$ lower that said first pressure $P_1$ and corresponding to said target pressure $P_T$.

To this end, the control unit 29 of the nozzle unit 27 is arranged to control the supply of gas. In the shown embodiment, the control unit 29 is arranged for selectively connecting the nozzle 30 with the two separate sources 28 of pressurized gas. A first of said sources 28 of pressurized gas is arranged for supplying the first gas flow $Q_1$ at said first pressure $P_i$ and a second of said sources 28 of pressurized gas is arranged for supplying the second gas flow $Q_2$ at said second pressure $P_2$. The control unit 29 may as a non limiting example comprise a valve member arranged to switch between said first and second gas flow in response to a given parameter, such a signal generated according with a predetermined time schedule or signals from a processor, a sensor or the like.

The control unit 29 may alternatively be connected to a single source of gas and also comprise a controller or regulator arranged to convert an electronic input signal to a proportional output pressure in order to deliver the first and second gas flow at said first and second pressure, respectively.

The nozzle unit 27 is arranged to deliver said first gas flow $Q_1$ for a period of time required to supply a gas volume sufficient to expand the handle, i.e. the first segment 8 of said handle compartment 7, to an inflated state but insufficient to reach said target pressure $P_T$ therein.

The subsequent delivery of said second gas flow $Q_2$ at said second pressure $P_2$ results in establishing the target pressure $P_T$ inside the handle. Once the target pressure $P_T$ has been reached, a state of equilibrium will arise provided leakage is prevented, since the supply of the second gas flow $Q_2$ at said second pressure $P_2$ corresponding to said target pressure $P_T$ is insufficient to further expand the volume of the handle. In has been found that leakage is practically eliminated with a nozzle 30 and abutment 31 design such as that disclosed above with reference to FIGS. 4 and 5.

The amount of gas delivered to the handle compartment 7 during the step of providing the first gas flow $Q_1$ may correspond to 5-75 weight % of the total amount of gas delivered to the handle compartment 7 during the step of providing the first gas flow $Q_1$ and the step of providing the second gas flow $Q_2$. In order to speed up the gas filling operation it may be beneficial to deliver as much gas as possible during the step of providing the first gas flow $Q_1$, and the upper limit of 75% may be used to ensure that the handle compartment 7 is not overfilled with gas during this step. If the time available for the gas filling operation so permits, it may be beneficial to deliver a lower amount of gas during the step of providing the first gas flow $Q_1$, in order to further ensure that no overfilling occurs.

An embodiment of the inventive method for handling a container of collapsible type in a filling machine 20 of the type described above with reference to FIG. 2 will now be described with reference to FIGS. 6a-d.

According to the inventive method, the containers are intermittently moved to the consecutively arranged stations. Thus, each container is moved step-by-step from each station to the next. The stations are arranged to be operated in parallel, i.e. one of the containers is being handled at one of the stations while other containers are being handled at the other stations.

In FIG. 6a, the transfer unit 40 has been operated by rotation of the mounts 42 such that the gripping members 41 have been brought along a respective circular path to the associated up-stream station. Also, the gripping members 41 have been moved to a closed position in order to pinch the container 1 located at the respective station.

Each gripping member 41 has retrieved an associated container 1 at the respective station, and thus, an unfilled container 1 provided in a flat state has been retrieved at the input station S1; a container 1 having an opened-up filling duct has been retrieved at the opening station S2; a container 1 having been filled with liquid product has been retrieved at the filling station S3; a container 1 having been provided with a seal closing the filling duct has been retrieved at the sealing station S4; and a container 1 having a gas filled handle compartment 7 has been retrieved at the gas filling station S5.

In FIG. 6b, the mounts 42 have been rotated in the direction indicated by arrows P2, whereby the each retrieved container 1 is being transferred towards the associated neighboring down-stream situated station along a respective circular path of movement. As indicated, the stations have been operated in order to allow the respective container to be retrieved and also to allow a new container to be received. Thus, the suction cups 21 have been deactivated and separated; the sealing jaws 25 have been separated; and the nozzle 30 has been separated from the abutment 31. As described above, while the gripping member 41 transfers the container 1 from the gas filling station S5 to the output station S6, the gas sealing unit 46 integrated in the associated gripping member 41 provides the container 1 with a seal entrapping gas introduced into the handle compartment 7.

In FIG. 6c, the mounts 42 have been continuously rotated in the P2 direction in order to position the gripping members 41 at the associated down-stream situated stations. At the respective station, the not shown grippers may then be activated for holding the container 1 transferred to the respective station.

Further, the seal provided by the gas sealing unit 46, integrated in the gripping member 41 according to the shown embodiment, is completed when the container 1 transferred by said gripping member 41 reaches the output station S6.

When the not shown grippers have been activated for holding the containers at the respective stations, the gripping members 41 may be opened thereby completing the transfer and delivery of the associated containers.

Figure 6D:
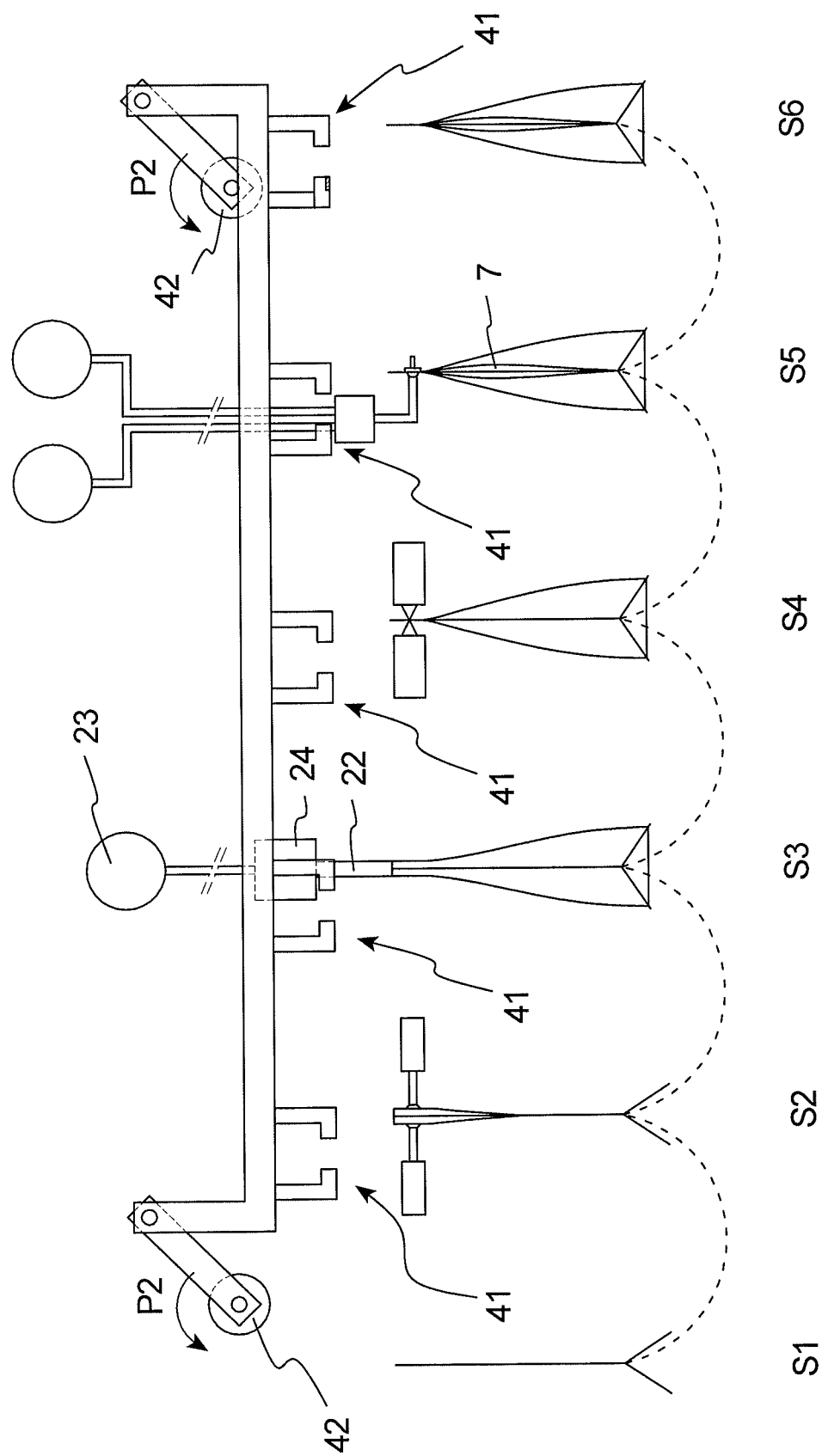

By continued rotation of the mounts 42 in the P2 direction, as shown in FIG. 6d, the gripping members 41 may be moved towards the associated pick-up position in order to initiate a new retrieval-transfer-delivery cycle while the associated operation is carried out at the respective station. As seen, a new container a have been provided at the input station S1.

According to the inventive method, the associated operations comprise at least filling of the product compartment at the filling station and gas filling of the handle compartment at the gas filling station. As mentioned, these operations are performed in parallel.

At the filling station S3, liquid product is delivered to the product compartment of the container 1 via the filling tube 22 inserted in the filling duct of the container 1. The liquid product is supplied from the liquid product source 23 by means of the product valve 24. The product valve 24 may be time controlled. Alternatively, the valve means may be operated based on input data received from a flow meter or any other input data indicating the amount of liquid product transferred to the product compartment of the container 1.

As mentioned above, the handle compartment 7 of the container 1 located at the gas filling station S5 is filled with gas while the product compartment of the container 1 located at the filling station S3 is filled with liquid product. The gas filling of the handle compartment 7 must be performed with high reliability as well as with high speed. The time available for completing the gas filling operation is determined by the time required for completing the liquid product filling operation in order to ensure that the gas filling operation does not limit the production capacity of the filling machine.

In order to ensure high reliability and high speed of the gas filling operation, the gas filling operation is performed in a two-step process which now will be described with reference to FIGS. 7a, 7b and FIGS. 8a-c.

In FIG. 7a a portion of a container 1 of the above described type is arranged between the nozzle 30 and the abutment 31 of the device 50. As evident from the figure, the container 1 is at this stage filled with product, but it is understood that the gas filling of the handle compartment 7 may alternatively be performed prior to filling of the container with product. Thus, the gas filling station S5 may be located up-stream relative to the filling station S3.

Figure 8A:
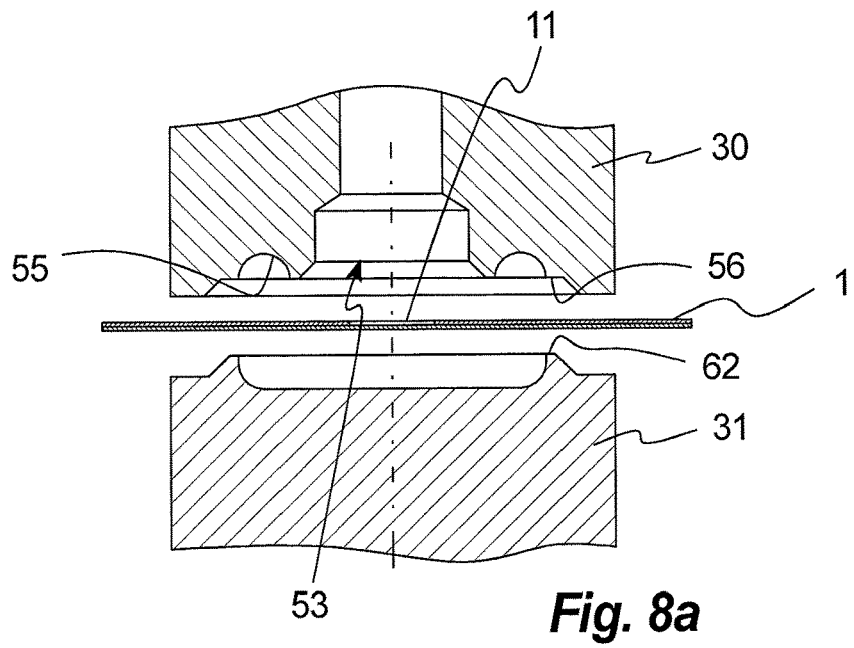
FIGS. 8*a*-8*c* are cross-sectional views of the nozzle and abutment of the nozzle unit in different steps for clamping and gas filling a handle compartment of a container during the gas filling operation.

The nozzle 30 and the abutment 31 are shown more in detail in FIG. 8a and this figure also illustrates the orientation of the second segment 10 of the container 1 with its inlet 11 to the handle compartment facing the nozzle 30.

Figure 8B:
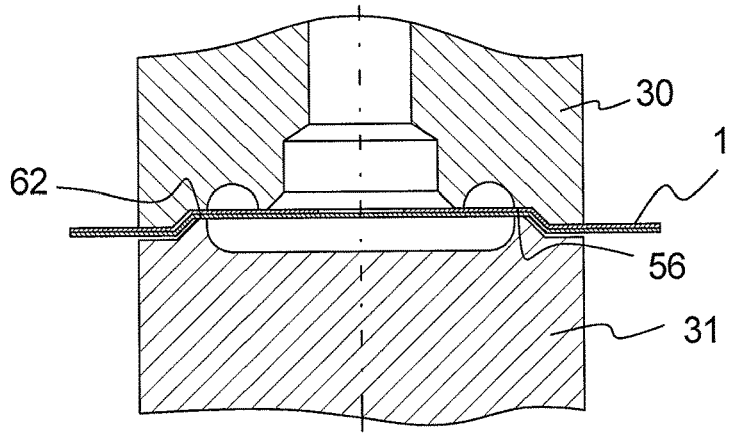

In FIG. 8b, the nozzle 30 and the abutment 31 have been brought together thereby clamping the container 1 by means of the engagement surface 56 of the nozzle 30 pressing against the abutment surface 62 of the abutment 31. The abutment 31 is arranged such that its side opening 63 is aligned with the third segment 9 of the handle compartment 7 (not shown).

FIG. 7b illustrates the nozzle 31 and the abutment 30 being brought together an operated to fill the handle compartment 7 with gas. As previously explained, the nozzle unit 27 is arranged to initially deliver the first gas flow $Q_1$ at the first pressure $P_1$ in order to inflate the handle compartment 7 but not sufficient to reach the target pressure $P_T$ inside the handle compartment 7, and subsequently to deliver the second gas flow $Q_2$ at the second pressure $P_2$ corresponding to the target pressure $P_T$ for establishing said target pressure $P_T$ inside the handle compartment 7. The delivery of gas is controlled by the control unit 29. The first pressure $P_1$ may be in the range of 1-7 bar or more preferable 1.8-3.5 bar above atmospheric pressure. The second pressure $P_2$ may be in the range of 0.3-2 bar and more preferably about 0.5-1.0 bar above atmospheric pressure.

Figure 8C:
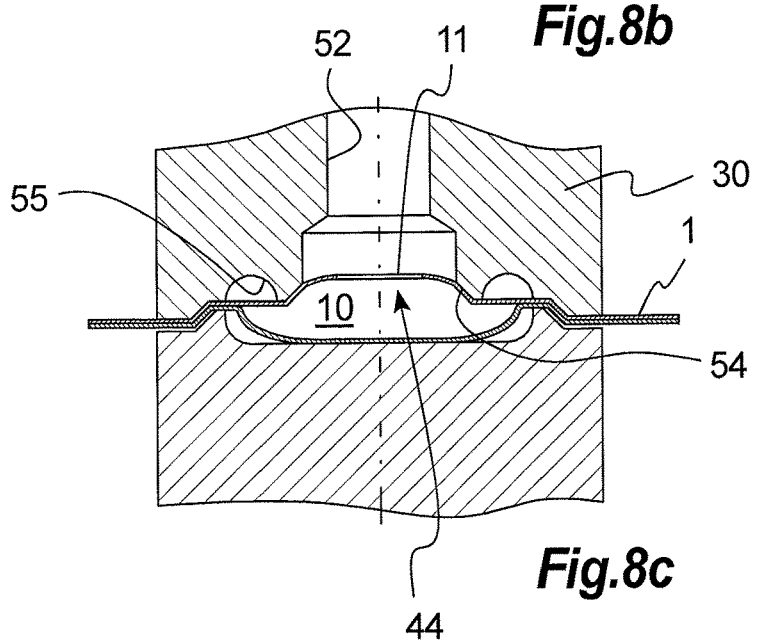

In FIG. 8c, the nozzle 30 and the abutment 31 clamping the container 1 during delivery of gas is disclosed. The recess 61 provided in the abutment 31 in combination with the recess-forming chamfered periphery 54 enclosing the outlet 53 of the central conduit 52 provided in the nozzle 30 result in that the opposite sidewall portions of the container 1 defining the second segment 10 of the handle compartment 7 bulge in opposite directions in response to the delivered gas entering the handle compartment 7 via the inlet 11. The nozzle 31 may be provided with an additional conduit (not shown) connecting the annular groove 55 with the surroundings in order to further ensure the sidewall portion facing the nozzle 31 to bulge in direction towards the nozzle 31 in response to the delivered gas.

As described above, the third segment 9 of the handle compartment 7 is aligned with the side opening 63 in the abutment 31, and thus the gas entering the second segment 10 of the handle compartment 7 is free to enter and inflate said third segment 9 and to proceed further to the first segment 8.

As described above, the nozzle unit 27 is arranged to initially deliver the first gas flow $Q_1$ at the first pressure $P_1$ and subsequently to deliver the second gas flow $Q_2$ at the second pressure $P_2$ which is lower than the first pressure $P_1$. The first gas flow $Q_1$ is used to inflate the handle compartment 7 and the second gas flow $Q_2$ is used to establish the target pressure $P_T$ inside the handle compartment 7.

As a result, inflation of the handle compartment 7 at high speed is achieved by means of the first high pressure gas flow $Q_1$ acting as a pressure surge.

The risk of rupture or bursting of the handle compartment 7 due to over filling is eliminated by means of the supply of the subsequent second gas flow $Q_2$ at the second pressure $P_2$ corresponding to the desired target pressure $P_T$.

The volume of the handle compartment 7 in inflated state may be in the range of 5-10 cm$^3$, and the first gas flow $Q_1$ may delivered for a time period in the range of 20-150 ms. The time required for establishing the target pressure $P_T$ by the second gas flow $Q_2$ may be in the range of 0.2-1 s.

In experiments preformed on containers having a handle compartment with an inflated volume of 7 cm$^3$ and using a device for gas filling with a nozzle and abutment as described above, the first gas flow $Q_1$ was delivered during 50 ms at 5 bar and the subsequent second gas flow $Q_2$ was delivered at 1 bar. The success rate of the gas filling process amounted to 99.9%.

Once the target pressure $P_T$ has been reached, the handle compartment 7 is sealed by means of a gas sealing unit 46.

FIGS. 9 and 10 schematically illustrate a step according to an embodiment of the inventive method of sealing the handle compartment by means of a sealing unit 46. The sealing unit 46 comprises a sealing jaw 48 which is movable for engagement with the container 1 in order to provide a seal 14 trapping the gas delivered to the handle compartment 7. More specifically, the sealing jaw 48 is arranged to engage the third segment 9 of handle compartment 7 in order to provide the seal 14 extending transversely across said third segment 9, which is shown in FIG. 11.

The sealing jaw 48 comprises a heatable sealing member 47 arranged side-by-side a non-heatable section 49 made of a material with low thermal conductivity, such as polyether ether ketone (PEEK). The non-heatable section 49 is oriented such it faces the pressurized side of the handle compartment 7, as shown in FIG. 10.

The seal 14 is accomplished by the sealing member 47, and the non-heatable section 49 ensures that the seal 14 is not exposed to the pressurized gas while being formed.

The gas sealing unit 46 may as described above be arranged in the transfer unit arranged for retrieving the container from the gas filling station.

Alternatively, the sealing unit may be arranged at the gas filling station or at a down-stream situated station separate from gas filling station.

It will be appreciated that the present invention is not limited to the embodiments shown. Several modifications and variations are thus conceivable within the scope of the invention which thus is exclusively defined by the appended claims.

The invention claimed is:

1. Method for handling containers of collapsible type in a filling machine comprising consecutively arranged stations comprising a filling station and a gas filling station,
   each container comprising two flexible opposing side walls defining a product compartment communicating with the environment via a filling duct and a separate handle compartment communicating with the environment via an inlet arranged in one of the two side walls,
   the handle compartment comprising a first segment intended to form a handle, a second segment comprising the inlet in one of the side walls, and a third segment formed as a narrow duct connecting the first and second segments, the method comprising
   intermittently moving the containers to the consecutively arranged stations,
   supplying, at the filling station, liquid product into the product compartment by means of a filling tube inserted in the filling duct of the container an supplying,
   at the gas filling station, gas into the handle compartment, comprising
   applying a single nozzle over the inlet by relative motion of the nozzle and an abutment towards each other thereby clamping the second segment of the handle compartment with the inlet facing the single nozzle, wherein the abutment comprise a body provided with a recess which is partially enclosed by a semi-circular abutment surface defining a side opening which is aligned with the third segment of the handle compartment, and
   subsequently supplying the gas through the single nozzle,
   wherein the filling station and the gas filling station are operated such that liquid product is supplied to the product compartment of one of the containers situated at the filling station while gas is supplied to the handle compartment of another of the containers situated at the gas filling station, characterized in that the step of supplying gas at the gas filling station comprises providing a first gas flow at a first pressure and delivering said first gas flow from the single nozzle to the handle compartment via said inlet,
   subsequently providing a second gas flow at a second pressure, lower than said first pressure, and delivering said second gas flow from the single nozzle to the handle compartment via said inlet for establishing a target pressure inside said handle compartment corresponding to said second pressure; and
   subsequently transferring each container from the gas filling station to an output station, using a gripping member comprising an integrated sealing unit, and while providing the container with a seal entrapping gas introduced into the handle compartment.

2. The method according to claim 1, in which, during the step of providing the first gas flow, an amount of gas is delivered to the handle compartment sufficient for inflation thereof but insufficient to reach said target pressure.

3. The method according to claim 1, in which, during the step of providing the first gas flow, an amount of gas is delivered to the handle compartment corresponding to 5-75 weight % of the total amount of gas delivered to the handle compartment during the step of providing the first gas flow and the step of providing the second gas flow.

4. The method according to claim 1, in which the first gas flow is supplied with the first pressure in the range of 1-7 bar above atmospheric pressure.

5. The method according to claim 1, in which the second gas flow is supplied with the second pressure in the range of 0.3-2 bar above atmospheric pressure.

6. The method according to claim 5, further comprising sealing the handle compartment with the integrated sealing unit once the target pressure has been reached.

7. The method according to claim 6, wherein the sealing is performed by means of a sealing jaw having a heatable sealing member and a non-heatable section with low thermal conductivity, wherein the sealing jaw is engaged with the handle compartment in order to provide a seal trapping the gas filling the handle compartment and wherein the non-heatable section of the sealing jaw is arranged to face the pressurized side of the handle compartment.

\* \* \* \* \*